(12) United States Patent
Brune

(10) Patent No.: US 7,523,599 B2
(45) Date of Patent: Apr. 28, 2009

(54) METHOD AND DEVICE FOR ADJUSTING THE SENSITIVITY OF A FOREIGN-OBJECT DETECTION DEVICE

(75) Inventor: Markus Brune, Marienfeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 478 days.

(21) Appl. No.: 11/210,931

(22) Filed: Aug. 24, 2005

(65) Prior Publication Data

US 2006/0046799 A1 Mar. 2, 2006

(30) Foreign Application Priority Data

Sep. 1, 2004 (DE) .................. 10 2004 042 620

(51) Int. Cl.
*A01D 75/18* (2006.01)
*A01F 12/16* (2006.01)
*G01V 3/08* (2006.01)
(52) U.S. Cl. .................................. 56/10.2 J
(58) Field of Classification Search ............... 56/10.2 J, 56/11.9, 10.2 G, 10.2 E; 460/2, 3, 4, 5, 6
See application file for complete search history.

(56) References Cited

U.S. PATENT DOCUMENTS

| | | | |
|---|---|---|---|
| 4,776,154 A | 10/1988 | Weiss et al. | |
| 4,805,385 A * | 2/1989 | Bohman et al. | 56/10.2 J |
| 6,105,347 A * | 8/2000 | Behnke | 56/10.2 J |
| 6,167,337 A * | 12/2000 | Haack et al. | 701/50 |
| 6,324,822 B1 | 12/2001 | Oliva | |
| 6,397,570 B1 * | 6/2002 | Bohrer et al. | 56/10.2 J |
| 7,140,169 B2 * | 11/2006 | Ameye et al. | 56/11.9 |
| 2003/0115846 A1 * | 6/2003 | Duncan | 56/10.2 J |
| 2006/0042211 A1 * | 3/2006 | Heinsey et al. | 56/10.2 J |

FOREIGN PATENT DOCUMENTS

| | | |
|---|---|---|
| DE | 199 04 626 | 8/2000 |
| EP | 0 217 418 B1 | 4/1987 |

* cited by examiner

*Primary Examiner*—Árpád Fábián-Kovács
(74) *Attorney, Agent, or Firm*—Michael J. Striker

(57) ABSTRACT

In a method and a device adjust the sensitivity of a detection device for foreign objects in an agricultural harvesting machine by way of which interfering signals are eliminated despite different and constantly changing harvesting conditions, thereby enabling prevention of unnecessary quick stops of the working assemblies and interruption of the harvesting operation.

17 Claims, 1 Drawing Sheet

METHOD AND DEVICE FOR ADJUSTING THE SENSITIVITY OF A FOREIGN-OBJECT DETECTION DEVICE

CROSS-REFERENCE TO RELATED APPLICATIONS

This application claims priority under 35 U.S.C. 119(a)-(d) to German Patent Application DE 10 2004 042 620.1, filed 1 Sep. 2004.

BACKGROUND OF THE INVENTION

The present invention relates to a method and a device for adjusting the sensitivity of a device for detecting foreign objects in an agricultural harvesting machine.

Agricultural harvesting machines are subjected to enormous stresses during the harvesting operation. For example, all working assemblies on a self-propelled field chopper, e.g., the cutting mechanism, pre-compression rollers or the chopping drum, are subjected to enormous stresses by the crop material to be processed. Foreign objects, such as stones or branches, located on the ground pose particular problems. Stones, in particular, are drawn up by the cutting mechanism along with the crop material and are conveyed by the pre-compression rollers to the downstream chopping drum. This often causes serious damage to the chopping knives located on the chopper drum and, as a result, the harvesting operation must be interrupted and the damaged chopping knives must be replaced, which is a time-consuming, expensive operation.

Publication EP 0 217 418 B1 discloses a foreign-object detection device for agricultural harvesting machines, a movable accelerometer being assigned to a movable feed device and being located perpendicular to the feed direction of the crop material strand. The direction in which measurements are carried out by the acceleration sensor is the direction in which the movable part of the feed device is displaced by the moving stream of crop material. A threshold value for a predefinable, maximum permissible acceleration of the deflection of the movable part of the feed device is specified in a data recording and evaluation unit. If it is determined that the actual acceleration of deflection of the movable part of the feed device exceeds the threshold value, a quick stop is triggered and all working assemblies in the agricultural harvesting machine are brought to a standstill.

The disadvantage of the design disclosed in publication EP 0 217 418 B1 is the fact that rapid deflections can also be caused when large quantities of crop material are drawn in, thereby resulting in an unnecessary triggering of a quick stop. In addition, the driver of the agricultural harvesting machine is unable to respond to changes caused by the crop material. It is not possible to quickly adjust the acceleration threshold value to the current harvesting requirements. An adjustment is required, e.g., when a different type of crop is harvested. For instance, the compressibility of grass is different from that of corn; as such, the movable part of the feed device is deflected to a different extent by different types of crop material. In particular, when processing grass which was set down on the field in a swath, the feed device undergoes considerable fluctuations in terms of deflection, since the swath is often unevenly shaped and grass tends to form grass clumps that stick together.

SUMMARY OF THE INVENTION

The object of the present invention, therefore, is to create a method and a device that detect foreign objects in a timely manner despite different and constantly changing harvesting conditions before the foreign objects enter the harvesting machine, therefore eliminating interference signals and preventing unnecessary quick stops.

In keeping with these objects and with others which will become apparent hereinafter, one feature of the present invention resides, briefly stated, in a method for triggering an idling of at least one working assembly in an agricultural harvesting machine, comprising the steps of assigning a device for detecting foreign objects and a control device in a crop material which is moved in the agricultural harvesting machine to the at least one working assembly; and adjusting a sensitivity of the detection device for foreign objects.

Another feature of the present invention resides in a device device for triggering an idling of at least one working assembly in an agricultural harvesting machine, comprising a device for detecting foreign objects and a control device in a crop material which is moved in the agricultural harvesting machine both assigned to the at least one working assembly; and means for adjusting a sensitivity said detection device for foreign objects.

Due to the fact that the sensitivity of the device for detecting foreign objects is adjustable, the detection device is tuned to the current harvesting conditions, thereby resulting in more reliable detection of foreign objects. In particular, a distinction is made between accelerations of, e.g., pre-compression rollers on a self-propelled field chopper due to fluctuations in crop material or due to foreign objects, thereby preventing the erroneous triggering of a quick stop of the pre-compression rollers.

In an advantageous further development of the present invention, the sensitivity can be adjusted immediately before and during the harvesting operation, without losing any time.

Due to the fact that the sensitivity of the device for detecting foreign objects is adjustable as a function of at least one threshold value—such as the moisture level in the crop material, the type of crop material, the throughput quantity, or the draw-in speed or rotational speed of the working assemblies—the driver of the agricultural working machine is relieved of some duties, since exact adjustment tuned to the current harvesting conditions is ensured.

Due to the fact that the threshold values can be specified, the driver is able to control the sensitivity of the device for detecting foreign objects as he sees fit. It is also feasible that the threshold values are set automatically via controlling electronics, so that the driver is relieved of the need to monitor the threshold values and need only concentrate on the harvesting operation.

Due to the fact that a control device receives, compares, and stores the signals from the sensitivity adjustment device and the device for detecting foreign objects, and triggers the quick stop of at least one working assembly as a function of the threshold values, interfering signals that would result in an unnecessary quick stop are eliminated. The adaptability of the threshold value, in particular, makes it possible to optimally adjust the threshold value and carry out an efficient harvesting operation. Changes related to the harvesting conditions do not negatively affect the detection of foreign objects, since they are eliminated and do not trigger a quick stop.

Since the idling of the at least one working assembly—which is the movable pre-compression roller on a self-propelled field chopper, in particular—takes place as a function of the vertical acceleration of this working assembly, the foreign object is detected at an early point in time at a place in the field chopper where the foreign object cannot cause any damage in the field chopper, since the powerful and sudden acceleration of the pre-compression roller indicates that a foreign object has been drawn in and the quick stop is triggered in a timely manner without the foreign object reaching the downstream working assemblies, such as a chopping drum.

A particularly effective safeguard against unnecessary quick stops is achieved by the fact that an adjustment device is assigned to the device for detecting foreign objects. As a result, the signals from the adjustment device are transmitted immediately to the detection device, so that the adjustment is carried out precisely and without delay.

Due to the fact that the device for detecting foreign objects is adjustable relative to the at least one movable working assembly, the detection device can be adjusted such that more minor erroneous signals triggered by the motion of the working assembly are ignored and a quick stop is not carried out unnecessarily.

Due to the fact that the device for detecting foreign objects is composed of a housing in which a movable lever preloaded via a tensioning element is located, the acceleration signals of the working assembly are detected in a cost-effective manner and with little production outlay, and are used to exactly adjust the sensitivity of the device for detecting foreign objects, in order to trigger a necessary quick stop.

To measure the signals responsible for the quick stop, an acceleration sensor or a rotary potentiometer can be assigned to the lever in a cost-effective manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
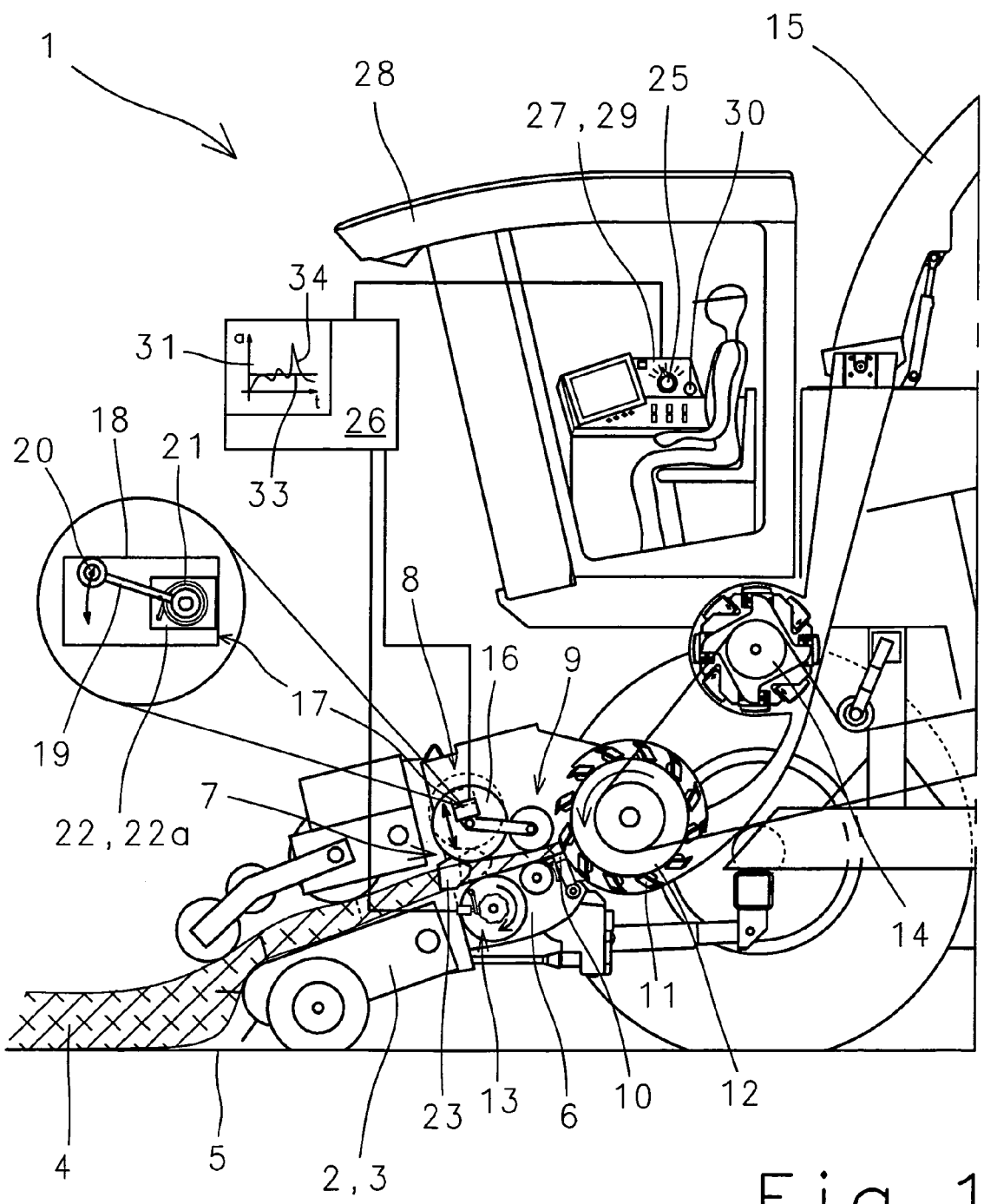
FIG. 1 is a schematic illustration of a self-propelled field chopper, in a side view, in accordance with the present invention.

FIG. 1 shows the schematic illustration of a self-propelled field chopper, in a side view, as an example of the application of the method according to the present invention and the device according to the present invention.

Attachment 2 mounted on the front of field chopper 1—the attachment being designed as pickup 3 in this case—can be replaced depending on the particular type of crop material 4 and serves to pick up crop material 4 from ground 5 and convey it to downstream working assemblies 8, 9.

Attachment 2, which is many meters wide, moves picked-up crop material 4 into a much narrower draw-in area 7 having the same width as feed channel 6.

In draw-in area 7, harvested crops 5 are acted upon by a first pair of pre-compression rollers 8 and compressed. A second pair of pre-compression rollers 9 is located downstream of first pair of pre-compression rollers 8, the second pair further compressing pre-compressed crop material 4 into a strand of crop material and feeding the crop material strand via a cutter 10 to chopping knives 11 of chopper drum 12. At cutter 10 located directly in front of chopper drum 12, crop material 4 is cut up by chopping knives 11, accelerated by post-accelerator 14 located downstream of chopper drum 12, and conveyed out of field chopper 1 via an adjacent ejector elbow 15.

A detection device 17 for foreign objects 23 is assigned to movable pre-compression roller 16 of first pair of pre-compression rollers 8, the task of which is to detect foreign objects 23—such as stones 23—in the crop material strand and trigger a quick stop of working assemblies 8, 9, thereby preventing damage to working assemblies 8, 9, 11, 12. After a foreign object 23 is detected and the quick stop is triggered, the driver of field chopper 1 initiates the reversing process, and foreign object 23 is ejected—along with crop material 4 already drawn in—out of field chopper 1. The driver removes foreign object 23 from crop material 4 and subsequently continues the harvesting operation.

Detection device 17 assigned to pre-compression roller 16 is composed of a housing 18 in which a movable lever 19 is integrated. The direction of motion of lever 19 is indicated by arrows. A weight 20 can be located on the free end of lever 19, the weight enhancing the motion of lever 19.

Due to the assignment of detection device 17 to movable pre-compression roller 16, detection device 17 matches the vertical acceleration of movable pre-compression roller 16. This means that, if the quantity of drawn-in crop material 4 changes during the harvesting operation, pre-compression roller 16 moves up or down in accordance with the changed thickness of the crop mat. The motion of pre-compression roller 16 is compensated for when the quantity of crop material is homogeneous. In contrast, pre-compression roller 16 moves up and down more extremely when the crop mat is non-uniform.

If a foreign object 23 is picked up with crop material 4, foreign object 23 acts on pre-compression roller 16. Since foreign object 23, such as stones 23, cannot be compressed in harvesting machine 1, when stone 23 hits pre-compression roller 16, the vertical acceleration of pre-compression roller 16 is greater than the acceleration of pre-compression roller 16 when non-uniform quantities of crop material are compressed. Accordingly, pre-compression roller 16 is deflected upward—directly and abruptly—by the foreign object.

The vertical acceleration of pre-compression roller 16 is matched directly by detection device 17 for foreign objects 23 assigned to pre-compression roller 16. Lever 19, which is movably integrated in housing 18, initially remains in place briefly due to its inertia—resulting from its bearing arrangement—when the acceleration of housing 18 sets in, before lever 19 undergoes the same acceleration of housing 18, although in a delayed manner. Weight 20 located on the free end of lever 19 serves the purpose of increasing the inertia of lever 19. Due to the fact that the acceleration of housing 18 during the acceleration procedure gradually drops off and the acceleration of lever 19 increases in proportion to the decreasing acceleration of housing 18, lever 19—which is moving upward, in the direction of the arrow—passes acclerated housing 18 and strikes the inner wall of housing 18.

To ensure that minor deflections or vibrations of pre-compression roller 16—which can be triggered by an uneven ground surface, among other things—do not affect the accuracy of signal generation, it has proven advantageous to assign a tensioning element 21, e.g., in the form of a spring, to lever 19. With the aid of tensioning element 21, lever 19 is placed under a defined preload, so that minor acceleration values of pre-compression roller 16 do not trigger movement or acceleration of lever 19, thereby preventing unnecessary stops in a simple manner.

To determine the acceleration of pre-compression roller 16, an acceleration sensor 22 is assigned to lever 19 in a first embodiment. If lever 19 with weight 20 now matches—with delay—the movement of housing 18, acceleration sensor 22 detects—by way of the deflection of lever 19—the acceleration that pre-compression roller 16 experienced. The detected acceleration signal is then transmitted to a control device 26 connected with detection device 17 for foreign objects 23, and is stored in control device 26.

In a further embodiment, other sensors such as a rotary potentiometer 22a can be used to measure the acceleration of pre-compression roller 16.

Control device 26 is also connected with a sensitivity adjustment device 27 and a quick-stop device 13. Sensitivity adjustment device 27 regulates the adjustment of the sensitivity of detection device 17 for foreign objects 23. In this sensitivity adjustment device 27, threshold values are input—according to the present invention—as a function of crop material or machine parameters as the basis for adjusting the sensitivity of detection device 17 for foreign objects 23, so that the driver of harvesting machine 1 can specify a defined threshold value directly and change it as he sees fit. Threshold values of this type can be, in particular, the moisture level in the crop material, the type of crop material, the throughput quantity, or the draw-in speed or rotational speed of the working assemblies 8, 9.

The moisture level in the crop material, type of crop material and throughput quantity affect the compressibility of crop material 4 and, therefore, the deflection of the particular pre-compression roller 16. For example, moist crop material 4 is easier to compress than dry crop material 4, and grass is easier to compress than corn. The draw-in speed and/or rotational speed of pre-compression rollers 8, 9 are decisive factors for triggering the quick stop. This means that, if the draw-in speed and/or rotational speed of pre-compression rollers 8, 9 increase, the reaction time for triggering the quick stop becomes shorter.

By adjusting the threshold values, timely and reliable detection of foreign objects 23 can therefore be ensured.

Sensitivity adjustment device 27 can be designed such that the threshold values can be entered manually by the driver of self-propelled field chopper 1 in cab 28 using a control panel 29, or (in a manner to be described in greater detail below), they can be adapted automatically as a function of the actual values generated by detection device 17 for foreign objects 23 and stored in control device 26 for determining a threshold value for triggering the quick stop.

Control device 26 connected with sensitivity adjustment device 27 receives and stores the signals and threshold values generated by sensitivity adjustment device 27 and compares these threshold values with the current actual values that are transmitted by detection device 17 to control device 26. To illustrate, a diagram that depicts the signal processing is inserted in FIG. 1. The acceleration a of pre-compression roller 16 is plotted on the y-axis, and the time t during which pre-compression roller 16 is accelerated is plotted on the x-axis. The driver of field chopper 1 enters a threshold value 33.

Threshold value 33 establishes the maximum permissible acceleration of pre-compression roller 16. If the actual acceleration value is higher than threshold value 33, control device 26 generates a signal at quick-stop device 13, and the quick stop is triggered in a manner known per se. To prevent the driver from making erroneous adjustments, a lower threshold value can be stored as a safeguard that ensures that a certain basic setting can never be fallen below and foreign object 23 of a minimum size can always be detected, even if the driver of field chopper 1 entered an erroneous, lower setting.

All acceleration values below threshold value 33 are permissible acceleration values which are generated by uneven ground surfaces or different compressions of crop material, thereby ensuring that a quick stop is not triggered in these cases.

It is within the framework of the present invention for the threshold values to be checked regularly and for the currently set threshold value to be adjusted by control device 26 as a function of the checked threshold values, so that the sensitivity of quick-stop device 13 can be adjusted in an optimal manner. This is advantageous, in particular, when non-uniform quantities of crop material are drawn in and processed at different drawing-in speeds. As a result, pre-compression roller 16 is subjected to greater deflections which could result in a permanent triggering of the quick stop if the threshold value is set too low.

It is within the scope of the ability of one skilled in the art to modify the exemplary embodiment described in a manner not presented, or to use it in other machines to achieve the effects described, without leaving the framework of the invention.

It will be understood that each of the elements described above, or two or more together, may also find a useful application in other types of methods and constructions differing from the types described above.

While the invention has been illustrated and described as embodied in a method and device for adjusting the sensitivity of a foreign object detection device, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A method for triggering an idling of at least one working assembly in an agricultural harvesting machine, comprising the steps of assigning a device for detecting foreign objects in a crop material which is moved in the agricultural harvesting machine and a control device to the at least one working assembly; adjusting a sensitivity of the detection device for foreign objects by sensitivity adjusting means, with said adjusting including changing the sensitivity of the detection device for foreign objects during a harvesting operation; receiving by the control device and storing signals and threshold values generated by the sensitivity adjusting means; and comparing the threshold values with current actual values transmitted by the detection device to the control device.

2. A method as defined in claim 1, wherein said adjusting includes changing the sensitivity of the detection device for foreign objects as a function of at least one threshold value.

3. A method as defined in claim 2, wherein changing the sensitivity of the device for foreign objects as a function of at least one threshold value includes using as the at least one threshold value a value selected from the group consisting of a moisture level in the crop material, a type of the crop material, a throughput quantity, a throw-in speed of the at least one working assembly, a rotational speed of the at least one working assembly, and combinations thereof.

4. A method as defined in claim 2; and further comprising setting the threshold value in a manner selected from the group consisting of manually setting and automatically setting.

5. A method as defined in claim 2; and further comprising receiving signals for adjusting the sensitivity of the detection device for foreign objects, comparing and storing the received signals in the control device; and triggering a quick stop of the at least one working assembly as a function of the at least one threshold value.

6. A method as defied in claim 2; and further comprising triggering the idling of the at least one working assembly when the at least one threshold value is exceeded.

7. A method as defined in claim 1; and further comprising idling of the at least one working assembly as a function of a vertical acceleration of the at least one working assembly.

8. A device for triggering an idling of at least one working assembly in an agricultural harvesting machine, comprising: a device for detecting foreign objects in a crop material which is moved in the agricultural harvesting machine and a control device, wherein both the detection device and the control device are assigned to the at least one working assembly; and means for adjusting a sensitivity of said detection device for foreign objects during a harvesting operation, wherein said control device is configured to receive and store signals and threshold values generated by said sensitivity adiusting means and to compare said threshold values with current actual values transmitted by said detection device to said control device.

9. A device as defined in claim 8, wherein said sensitivity adjusting means include a sensitivity adjusting device assigned to said detection device for foreign objects.

10. A device as defined in claim 9, wherein said control device is located between said detection device for foreign bodies and said sensitivity adjusting device.

11. A device as defined in claim 9, wherein said control device is formed so as to compare a threshold value stored in said sensitivity adjusting device with an actual value detected by said detection device for foreign objects so that if the threshold value is exceeded, the idling of at least one working assembly is triggered.

12. A device as defined in claim 8, wherein the at least one working assembly is configured as pre-compression rollers provided on the agricultural harvesting machine formed as a self-propelled field chopper.

13. A device as defined in claim 8, wherein said detection device for foreign objects has a housing in which a movable lever is located and preloaded via a tensioning element.

14. A device as defined in claim 13; and further comprising an element assigned to said lever and formed as an element selected from the group consisting of an acceleration sensor and a rotary potentiometer.

15. A device as defined in claim 8, wherein the at least one working assembly is a movable working assembly, said detection device for foreign objects being assigned to the movable working assembly.

16. A device as defined in claim 8, wherein the at least one working assembly is a movable working assembly, said detection device for foreign objects being adjustable relative to said movable working assembly.

17. A device as defined in claim 13, wherein the at least one working assembly is a movable working assembly, said lever of said detection device for foreign objects matching a motion of the movable working assembly.

\* \* \* \* \*